(12) United States Patent
Peterson et al.

(10) Patent No.: US 6,793,416 B2
(45) Date of Patent: Sep. 21, 2004

(54) SYSTEM AND METHOD FOR PROTECTING AND CLEARING THE LENS OF AN OPTICAL SURVEILLANCE DEVICE OPERATING IN A HOSTILE ENVIRONMENT

(75) Inventors: William Peterson, Oak Hill, VA (US); Brian Boesch, Oak Hill, VA (US)

(73) Assignee: Professional Sounds, Inc., Sterling, VA (US)

( * ) Notice: Subject to any disclaimer, the term of this patent is extended or adjusted under 35 U.S.C. 154(b) by 66 days.

(21) Appl. No.: 10/390,376

(22) Filed: Mar. 17, 2003

(65) Prior Publication Data

US 2003/0210906 A1 Nov. 13, 2003

Related U.S. Application Data

(60) Provisional application No. 60/364,647, filed on Mar. 15, 2002.

(51) Int. Cl.[7] .................................................. G03B 17/00
(52) U.S. Cl. ........................ 396/427; 396/535; 348/143; 348/148; 348/373
(58) Field of Search .......................... 396/25, 427, 535; 348/81, 143, 148, 373

(56) References Cited

U.S. PATENT DOCUMENTS 5,240,220 A * 8/1993 Elberbaum .................. 248/558
6,507,024 B2 * 1/2003 Stewart ...................... 250/353

OTHER PUBLICATIONS

SecuScan—The Under Vehicle Monitoring System.—http://www.secuscan.com/englisch/downloads/broschuereenglisch.pdf.

* cited by examiner

*Primary Examiner*—David M. Gray
(74) *Attorney, Agent, or Firm*—Roberts, Abokhair & Mardula, LLC

(57) ABSTRACT

A system and method for cleaning an optical device in a hostile environment. A camera system is mounted in a protective mounting structure which may be unitary or comprise layers of material. The camera lens is covered by a scratch resistant cover and is cleaned by user operated bursts of air when debris obstructs the view of the camera. Debris is blown out of the aperture of the unit. When water collects on the lens cover, it is drained by a channel that also provides air via a venturi effect when air is blasted over the lens cover during cleaning.

12 Claims, 5 Drawing Sheets

SYSTEM AND METHOD FOR PROTECTING AND CLEARING THE LENS OF AN OPTICAL SURVEILLANCE DEVICE OPERATING IN A HOSTILE ENVIRONMENT

RELATIONSHIP TO OTHER APPLICATIONS

This application claims priority under 35 U.S.C. §119(e) from provisional application number 60/364,647 filed Mar. 15, 2002. The provisional application 60/364,647 is incorporated by reference herein, in its entirety, for all purposes.

BACKGROUND OF THE INVENTION

This invention relates generally to protecting and clearing the lens of a camera lens when operated in a hostile environment. More particularly, the present invention is a method an apparatus for protecting and clearing a camera lens of a camera used in an environment that regularly exposes the camera lens to dirt, debris, water or other liquid or solid matter, or abrasive contact such as to impair or occlude the image of the camera.

BACKGROUND ART

The evolution of the camera is an odd mix of science, luck, and insight. Until George Eastman produced a camera pre-loaded with a paper-based film, cameras were largely in accessible to the general public. Shortly thereafter, he substituted celluloid for the paper base. Other improvements followed, including increased light sensitivity of the film, better printing papers and more predictable processing chemistry. The camera became a tool, not just a gadget.

The first cameras recorded still images on self-contained media. Movie cameras followed.

The camera took an evolutionary turn with the development of television. The video cameras did not record images but transmitted them. The recording of the image produced by the video camera was separated from the capture and transmission of that image.

Besides being a tool for photographic arts, cameras are a major component of security, surveillance and monitoring systems. Optical surveillance devices—be they still cameras, movie cameras, or video cameras—are very much apart of modem life. We are watched on the highway, at the bank, in the lobby of hotels, at airports, and retail establishments. Optical surveillance allows commercial enterprises to protect their property, traffic control officials to monitor highways, and security personnel to keep a watchful eye on airports and other locations that may be targets of terrorism. Recent events have increased the demand for optical surveillance and optical surveillance devices.

Conducting optical surveillance is a difficult proposition under any conditions, but is an especially difficult task when the optical surveillance device must operate and survive a variety of environmental elements and physical hazards. Optical surveillance devices that are located out of doors are exposed to rain, snow, mud, dust, fuel, and exhaust gases just to name a few of the environmental hazards they may face. The challenge under such conditions is to protect the optical surveillance device from environmental elements, remove any liquid and/or from the optical elements of the optical surveillance device, and maintain the performance of the optical surveillance device with as little manual intervention as feasible. At present, the state of the art is to incorporate an optical surveillance device into a "fair weather" system that operates only in benign weather conditions or to build a shelter over the optical surveillance device that will protect its critical components from the elements. Both of these approaches have only moderate success as even under the best of conditions.

Where the surveillance target is the undercarriage of a vehicle, the problem is compounded as vehicle traffic imparts dirt and debris to the optical surveillance device. Even shelters provide only moderate protection of the optical surveillance device as wet or snowy vehicles drip onto the lens or lens cover of the optical surveillance device rendering the optical surveillance device unusable until its lens or its cover are manually cleared. Further, the lens or lens cover is necessarily under the vehicle and thus is subject to abrasive contact from both dropped debris and vehicle tires. This wear will eventually damage the lens or lens cover. Simply recessing the lens or lens cover to protect against wear abrasion is not a viable solution as it creates a cavity thereby exacerbating the debris collection over the optical surveillance device.

What is needed is a system to clear the lens or lens cover of an optical surveillance device when covered with liquid or solid debris with a minimum of human intervention. This system must be easy to use and not interfere with the operation of the optical surveillance device or with its mission. The system must further require only minimal maintenance. The lens of the optical surveillance device must be protected from abrasive contact.

DESCRIPTION OF THE INVENTION

It is therefore an object of the present invention to clear the lens or lens cover of an optical surveillance device of liquid or solid debris with a minimum of human intervention.

It is a further object of the present invention to protect the lens of an optical surveillance device from abrasive contact.

It is yet another object of the present invention to protect an optical surveillance device from environmental hazards.

It is still another object of the present invention to maintain the image quality of an optical surveillance device at all times.

These and other objects of the present invention will become apparent from a review of the general and detailed description that follows. An embodiment of the present invention is a system for protecting the lens of an optical surveillance device with a lens cover of scratch-resistant transparent material, mounting the optical surveillance device in a protective mounting structure such that the lens cover of the optical surveillance device is recessed from the top opening of the protective mounting structure while maintaining the necessary field of view, and for automatically or semi-automatically clearing the lens cover of the optical surveillance device of liquid and solid debris. In the present invention, the clearing of the lens cover is achieved using a source of compressed gas and directing a high-pressure burst of gas over the lens cover. The gas flow is modulated by an air pressure regulator. When debris is detected (either visually or by the optical surveillance device), the an air pressure regulator releases a burst of gas from the gas source. The gas is passed through a vortex generator that not only directs the gas onto the lens cover of the optical surveillance device but also mixes the gas with ambient air, thereby increasing the volume of gas that passes over the lens cover. The burst of gas clears the lens cover of liquid debris by forcing the liquid from the recess created by the protective recessing spacer between the top of the protective mounting structure and the lens cover into at least one drain hole in the protective mounting structure in which the optical surveillance device is mounted. Light, solid debris may either be expelled from the recess between the top of the protective mounting structure and the lens cover. In another embodiment of the present invention, solid debris is pushed into collection chambers in the protective mounting structure for later removal. In the present invention, the presence of continued image deterioration informs the operator that automatic cleaning cannot clear the lens and that manual cleaning may be necessary. Alternatively, automatic/semi-automatic image review may perform this function and inform the operator of the need for manual cleaning by alarm or other signal.

DETAILED DESCRIPTION OF THE INVENTION

As noted above the present invention is a system for cleaning the lens of a surveillance camera used for inspecting the undercarriage of a vehicle. When it is determined that liquid or solid debris are impairing the performance of the optical surveillance device, a burst of compressed gas is applied to the gas output port and is directed to the surface of the lens cover, sweeping solid and liquid debris to the side and off the lens cover. The blast is designed to be strong enough to lift small rocks, pebbles, as well as sand, water, light oil, snow and ice crystals out of the recess created by the protective recessing spacer.

Figure 1:
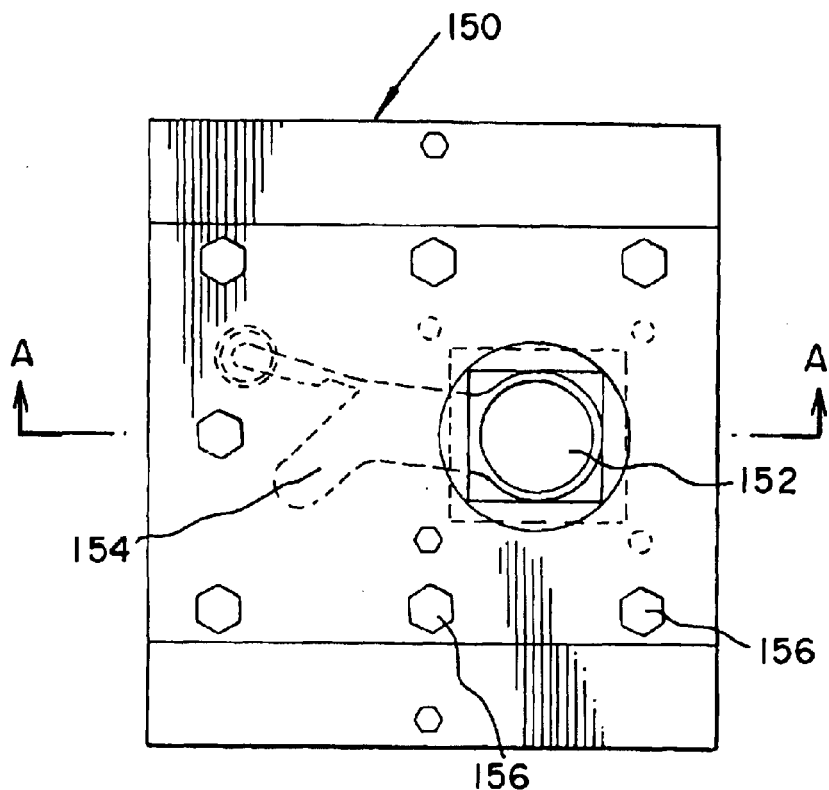
FIG. 1 illustrates a top view of the present invention illustrated noting the various features of one embodiment (in phantom).

Referring to FIG. 1, a top view of the present invention illustrated noting the various features of one embodiment (in phantom). An embodiment of the present invention is a protective mounting structure comprising a series of layers of rigid material, each layer adding to the stability of the unit in the hostile environment in which it will be placed (i.e. entrances to garages, buildings outdoor functions). As will be explained in more detail below the protective mounting structure 150 comprises a camera aperture 152, a path for an air wash lens cleaning structure 154 and fasteners 156 to hold the structure together. While FIG. 1 illustrates a protective mounting structure comprising plates, the present invention is not so limited. A protective mounting structure as described herein may be assembled from machined components without departing from the scope of the present invention.

Figure 2:
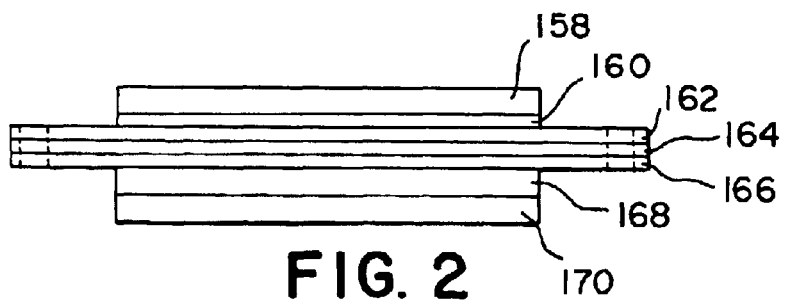
FIG. 2 illustrates a side view of the present invention.

Referring to FIG. 2, a side view of the present invention is illustrated. As noted in this FIG. 2, an embodiment of the present invention is a protective mounting structure comprising a stack of seven flat metallic members through which passages are milled for fasteners, for the optical device and for other purposes noted below. While seven layers are shown this is not meant as a limitation. Layers can be combined and/or added as necessitated by the physical circumstances of the placement of the camera system. The thickness of the layers is dictated in part by the function of each layer. Thus layer 158 serves as a protective recessing spacer so that tires that roll over the camera where it is placed do not touch the lens cover. It also comprises holes for fasteners that hold the entire structure together as a unit. The next layer 160 separates the protective recessing spacer 158 from the layer comprising the air wash cleaning structure 162. Layer 164 comprises a holder for a sapphire lens protector. Layer 166 comprises the lens structure of the camera while layers 168 and 170 comprise the port for mounting the camera and at least one drain hole for water and an air inlet for incoming air to help clean the lens.

Figure 3:
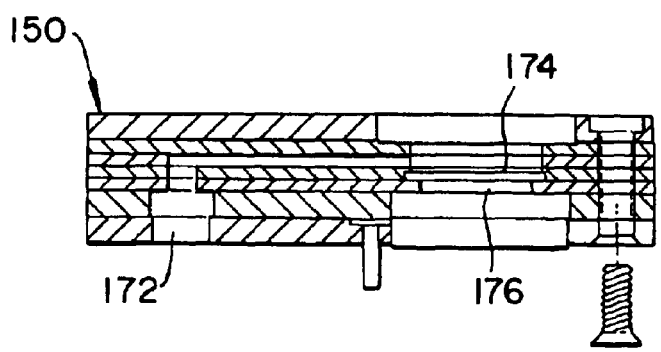
FIG. 3 illustrates a cutaway view of the present invention.

Referring to FIG. 3 a cutaway view of the present invention is illustrated. The protective mounting structure 150 is illustrated with the airway 172 for providing a stream of pressurized air to clean the lens cover 174 that covers lens 176. Air is delivered through the airway 172 blowing any debris off the lens cover 174 thereby allowing a consistently unobstructed view of the underside of vehicles. It should be noted that the airway is formed by holes in the various layers 162, 164, 166, 168, and 170.

Figure 4:
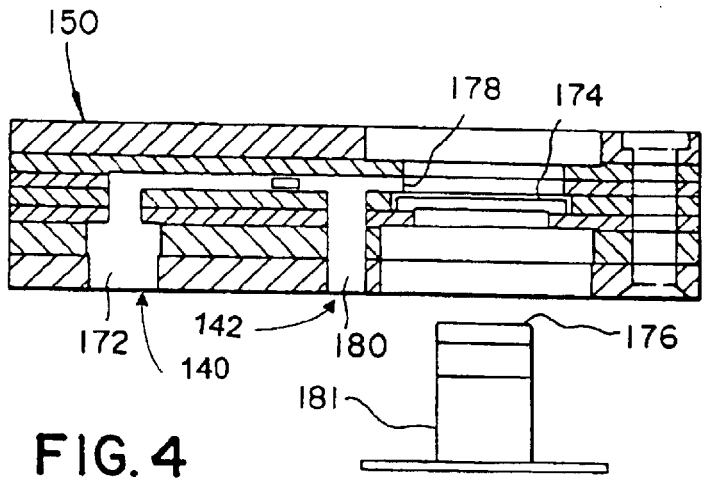
FIG. 4 illustrates a further a cutaway view of the present invention.

Referring to FIG. 4 a cutaway view of the present invention is illustrated. The protective mounting structure 150 comprises airway 172 through which air is delivered to clean the lens cover 174, which, as noted above, in the exemplary embodiment is a sapphire component. This resists scratching and is very strong to both protect the lens and to provide a clear view of the underside of a vehicle. It should be noted however, that this material is not meant as a limitation. Other scratch resistant materials may also be used, the main function being that the lens of the camera be protected and that debris can be collected at that point without the debris and water reaching the camera lens. Air is provided to airway 172 via air supply port 140. An air output port 178 in layer 162 permits air that is delivered through airway 172 to be blown over the sapphire lens cover 174. Air intake channel 180 is also provided which accomplishes two purposes. When air is supplied through airway 172, a venturi effect is created thereby pulling more air in through air intake channel 180 to clean the lens cover 174. During rainy weather, air intake channel 180 serves to drain any water away from the lens cover 174. Air is delivered to air intake channel 180 via air intake hole 142.

Camera system 181 comprising lens 176 mounts into the camera aperture of the unit 150 until the lens is just below lens cover 174. Thus the camera system 181 is protected from the elements and any damage from vehicles by the lens cover 174 and the rigid structure of protective mounting structure 50.

Figure 5:
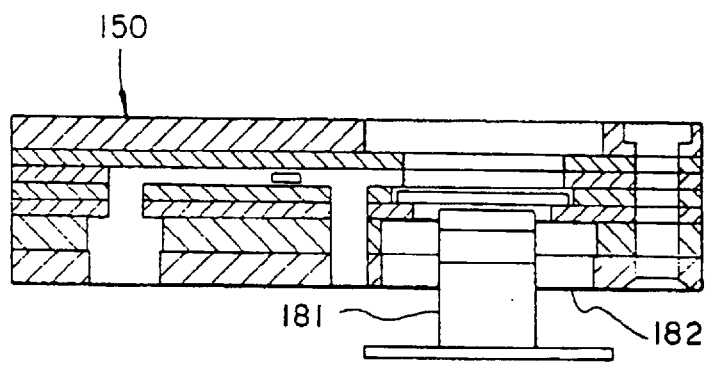
FIG. 5 illustrates the present invention with the camera as system mounted.

Referring to FIG. 5 an embodiment of the present invention with the camera system mounted is illustrated. Camera system 181 is mounted into the protective mounting structure 150 and secured in place with a potting compound known in the art. This may be a silicon, phenolic, resin or other materials that are use to enclose and protect electronic components form the elements. With the camera system in place, protective mounting structure 150 can be placed with other units in an array to cover the full width of vehicles and image the vehicles as they roll over the array.

Figure 6:
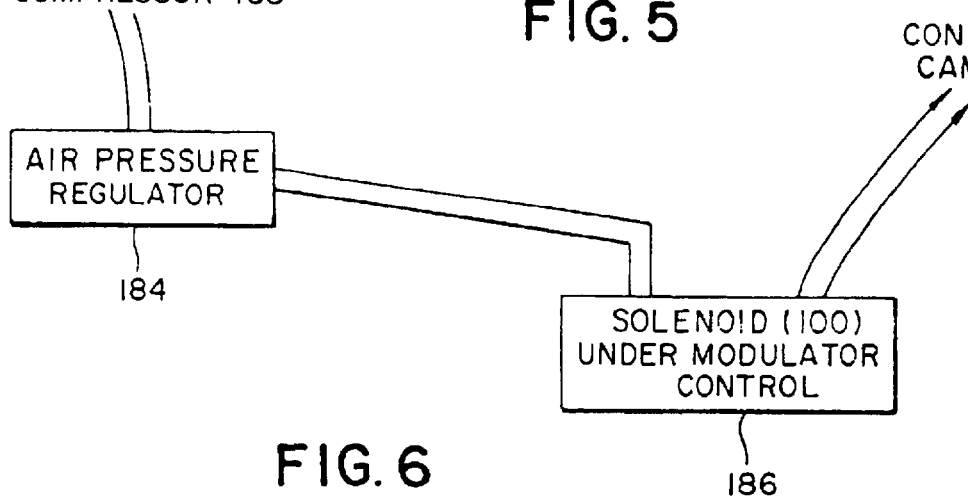
FIG. 6 illustrates the air system of the present invention in concept.

Referring now to FIG. 6 an embodiment of the present invention is illustrated in concept. The system comprises an air supply 188, which may be either a pump or compressed air feeding an air pressure regulator 184. Thus the pressure of the air that is supplied to the unit is proper for the cleaning anticipated. A solenoid 186 is connected to the air regulator that is actuated on demand by an operator when lens cleaning is needed. Air then flows to the air supply port 140 to airway 172 and into the system for providing the desired cleaning.

Figure 7:
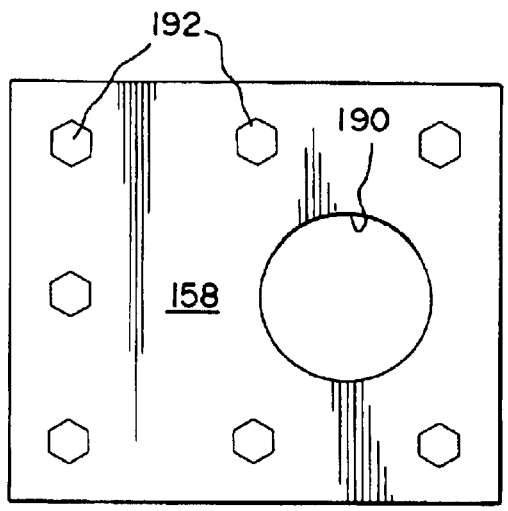
FIG. 7 illustrates the top layer 158 of the present invention.

FIGS. 7 through 13 illustrate the various layers of the present invention. FIG. 7 illustrates the top layer 158 of the present invention. This layer provides for an aperture 190 through which images are taken. As noted earlier, this layer is thicker than other layers to provide spacing so that tires that run over the unit do not come in contact with the lens cover. Fastener holes 192 are present to allow fasteners to hold the unit together.

Figure 8:
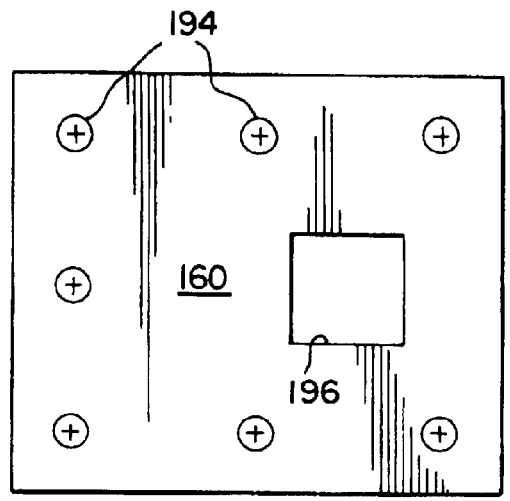
FIG. 8 illustrates layer 160 of the present invention.

Referring to FIG. 8, layer 160 is illustrated. This layer comprises an aperture 196 that provides further spacing and through which an image can be collected. This layer has holes 194 through which the fasteners are set to hold the unit together. This layer 160 also provides the top for the air passage in the next layer.

Figure 9:
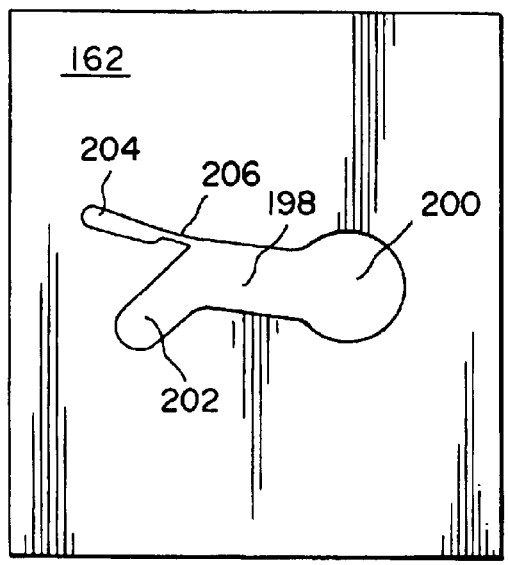
FIG. 9 illustrates layer 162 that forms the air passage of the present invention.

Referring now to FIG. 9, layer 162 is illustrated. This layer has an aperture through it that comprises different sections. A portion of the aperture 200 is the section through which the image is collected. It also comprises an area for the airway 172 (see FIG. 4) to channel air to the sapphire lens cover. This air passes through section 204 where it flows to a restricted section of the airway 206 thereby increasing the velocity of the air passing over the lens cover. Section 202 admits air coming through air intake channel 180 by virtue of the venturi effect created by air passing over the air intake hole 142 (see FIG. 4). Thus air from sources 204 and 206, and 202 all come together to blast any debris from the surface of the sapphire lens cover 174. Also present in this layer but not shown are the holes for fasteners to hold the unit together.

Figure 10:
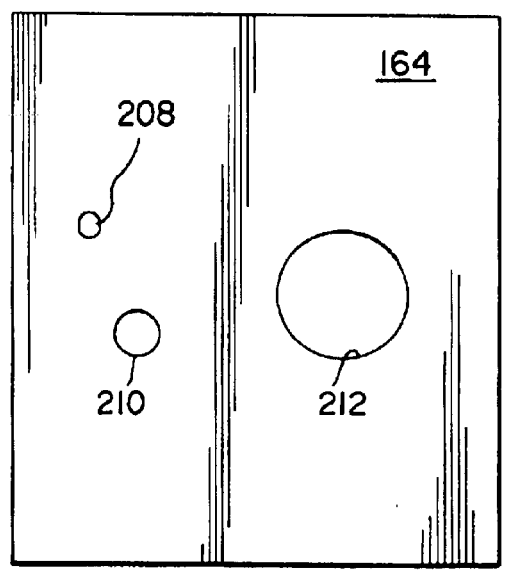
FIG. 10 illustrates layer 164 that forms the bottom of the air passage noted in FIG. 9

Referring now to FIG. 10, layer 164 is illustrated. This layer forms the bottom of the air passage noted in FIG. 9. It comprises hole 208 through which the pressurized air is supplied by the operator and hole 210 through which air is pulled via the venturi effect. This latter hole 210 also serves as a drain hole in the event that water begins to fill the aperture during rain or other times. The layer also comprises an aperture 212 into which the sapphire lens cover 174 is mounted. This layer also comprise holes through which fasteners are mounted to hold the unit together.

Figure 11:
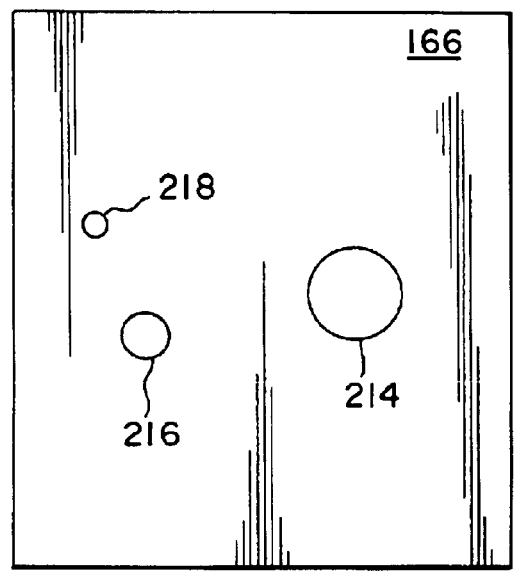
FIG. 11 illustrates layer 166 comprising an aperture into which the lens of the camera system is mounted.

Referring to FIG. 11, layer 166 is illustrated. This layer comprises aperture 214 into which the lens of the camera system is mounted. The lens of the camera system is covered by the sapphire lens cover in layer 164. This layer also comprises hole 218 through which pressurized air is supplied and hole 216 through which air is pulled by a venturi effect. This hole 216 also serves as a drain hole for any water that collects over the unit during rain.

Figure 12:
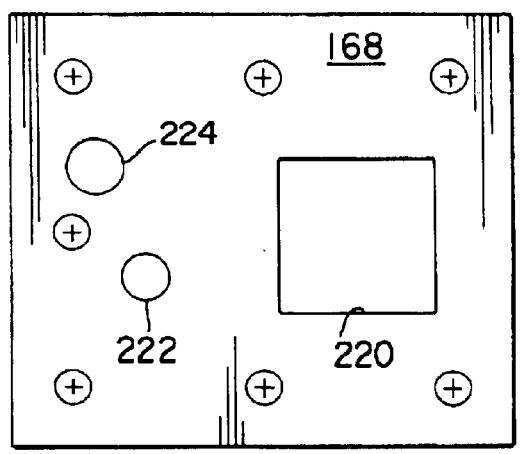
FIG. 12 illustrates layer 168 layer comprising an aperture through which the cameras system is mounted and potted.

Referring to FIG. 12, layer 168 is illustrated. This layer provides an aperture 220 through which the cameras system is mounted and potted. It also comprises hole 224 through which pressurized air is supplied and hole 222 through which air is pulled via the venture effect and which also serves as a drain hole for water that collects over the lens cover. This layer also comprises holes through which fasteners are mounted to hold the unit together.

Figure 13:
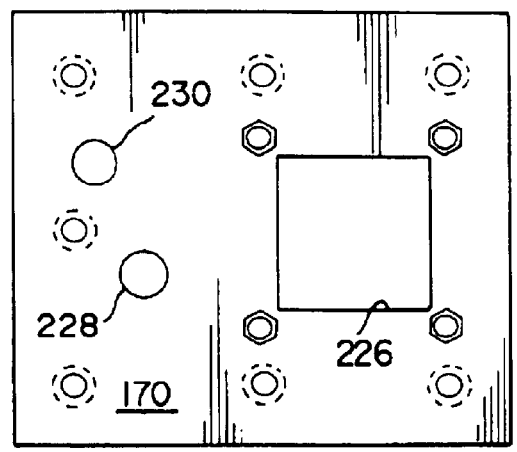
FIG. 13 illustrates the bottom layer comprising an aperture 226 through which the camera is mounted.

Referring to FIG. 13, the bottom layer 170 is illustrated. This layer comprises an aperture 226 through which the camera is mounted. It also comprises air supply port 230 through which pressurized air is supplied and air intake hole 228 through which air is pulled via the venturi effect and which acts as a drain hole if water collects over the lens cover.

As noted above in the exemplary embodiment, the lens cover is sapphire, although this is not meant to be a limitation since any other material that is hard, transparent and has equal or better light transmission characteristics will be satisfactory to execute the tasks of the lens cover. Similarly, in the exemplary embodiment, the potting material is Silicone based flowable caulk (either two part or Room Temperature Vulcanization RTV variety), but any potting material that is structurally strong enough to secure the optical surveillance device, lens, and lens cover to the protective mounting structure and otherwise resists cracking is acceptable.

During this process, the lens is in direct contact with lens cover. The resulting assembly is completely sealed. Breaching of the mounting point or even leakage in the lens cover assembly will not allow moisture to reach the optical surveillance device or lens. Further, by selecting a potting material that is both water tight and strong, there is no need to mounting the optical surveillance device to the protective mounting structure, thus simplifying assembly and further decreasing manufacturing cost. Keeping the optical surveillance device on during the mounting process and viewing the optical surveillance device output on a monitor further simplifies the critical step of aligning the optical surveillance device. This result is that the optical surveillance device is aligned with the lens cover and sealed in the protective mounting structure in one operation.

As noted above, the exemplary embodiment illustrated in FIGS. 2 through 13 is constructed from a number of flat layers of chosen dimensions. Each layer is cut into a two-dimensional pattern allowing individual layers to be drilled, punched or laser-cut without requiring specialized three-dimensional machining. The layers are assembled and sealed using an appropriate sealant or by using a sealing gasket prior to assembly. However, this is not meant as a limitation. The protective mounting structure may also be a precision machined three-dimensional parts, although this would be more costly.

In another embodiment of the present invention, the protective recess spacer above the lens cover is perforated by one or more liquid drain and debris channels opposite the gas output port. The liquid drain acts to minimize the amount of liquid debris that accumulates on the lens cover while also providing a place for liquid debris to exit the recess created by the protective rim when gas from the gas output port is applied to the lens cover. Similarly, solid debris that is not lifted out of the recess created by the protective rim when gas from the gas output port is applied to the lens cover is forced into the solid debris channel where it can be removed during normal maintenance. While only one liquid drain and one debris channel are illustrated, this is not meant as a limitation.

In an exemplary embodiment, the determination that the operation of the optical surveillance device is impaired and in need of clearing is made by the operator of the optical surveillance device, but this is not the only way such a determination may be made. In another embodiment of the present invention, this determination is made by an image monitoring system that samples and evaluates image quality.

In yet another embodiment, the gas source is first connected to a pneumatic amplifier, which is then connected to the gas output port.

Referring to FIG. 4, a gas source (not shown) is connected to a nozzle (not shown). The nozzle opens to airway 172 that connects to air output port 178. The airway 172 is significantly larger than the nozzle and has access to outside air through air intake hole 142. Because the gas applied to the nozzle is under pressure and the airway 172 is larger than the nozzle and has access to outside air, the gas stream that exits the airway is amplified several fold. The additional volume of air provides better cleaning. In addition, the gas stream is widened during the amplification process allowing cleaning of a larger lens cover. While a means of amplifying the gas stream has been illustrated, it is understood that other means of amplifying the gas stream may be employed without departing from the scope of the present invention.

Figure 14:
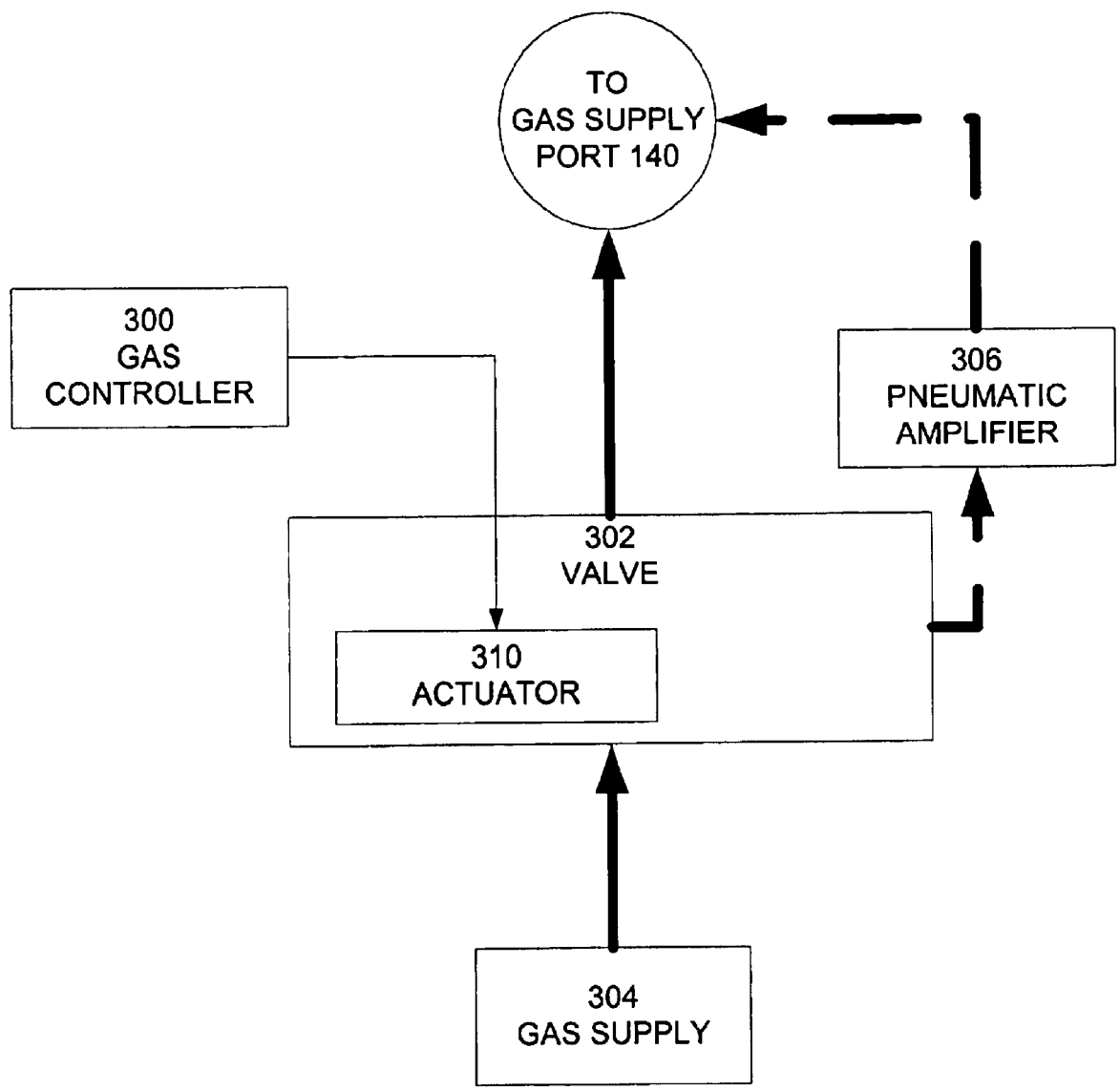
FIG. 14 illustrates use of a valve and an actuator according to an embodiment of the present invention.

In still another embodiment of the present invention, the application of compressed gas to the gas output port is regulated so as to minimize waste thereby allowing the source of the compressed gas to be smaller. Referring to FIG. 14, compressed gas controller 300 is connected to actuator 310 of valve 302. The valve 302 connects on the supply side to the gas source 304. The output side of valve 302 connects to the air supply port 140 of the protective mounting structure (see FIG. 4). At the initiation of the user, the compressed gas controller 300 commands actuator 310 to open the valve 302 to send compressed gas to the air supply port 140. The compressed gas controller 300 is programmable allowing the operator to set parameters for the length of time the valve is open, the number of times the valve is open during a cleaning cycle, and the time between valve openings in multiple-opening cycle. In an alternate embodiment, a pneumatic amplifier 306 is used is conjunction with the gas controller 300. In this embodiment, the output side of the valve 302 connects to the pneumatic amplifier 306 and the output of the pneumatic amplifier 306 connects to the gas supply port 140.

In another embodiment, an optical surveillance device protection apparatus comprises a housing, having walls and a bottom that define cavity therein, said cavity having a closed portion and an open portion, an optical surveillance device secured within said cavity, said optical surveillance device having a lens structure directed to said open portion, a lens cover secured within said cavity and in contact with lens structure cavity; and a protective rim having an inner and outer wall surrounding said cavity and attached to said housing above said lens cover thereby protecting said lens cover from intrusion by foreign objects and materials. Optionally, the optical surveillance device is selected from the group consisting of a still camera, a movie camera, a camcorder, and a video camera. In another variation of this embodiment, the lens cover is sapphire. In still another variation of this embodiment, the optical surveillance device, the lens, and the lens cover are secured in said housing by a potting compound. Optionally, the potting material is RTV.

In another embodiment of the present invention, an optical surveillance device clearing apparatus of comprises a housing, having walls and a bottom that define cavity therein, said cavity having a closed portion and an open portion, an optical surveillance device secured within said cavity, said optical surveillance device having a lens structure directed to said open portion, a lens cover secured within said cavity and in contact with lens structure cavity; a protective rim surrounding said cavity and attached to said housing above said lens cover, said protective rim having a gas output port positioned through said inner and outer wall, a valve having an input side, an output side, and an actuator for opening and closing said valve remotely, a source of compressed gas connected to said input side of said valve, a controller connected to said actuator, said controller programmed to open and close said valve based on predetermined parameters such that a burst of gas is directed to said gas output port and onto and parallel with said lens cover thereby removing debris from said lens cover. Optionally, the compressed gas is compressed air. In an alternative embodiment, the predetermined parameter is the length of time said valve is opened. In another alternative embodiment, the predetermined parameter is the number of times said valve is open and closed. In yet another alternative embodiment, the predetermined parameter is the length of time between openings of said valve. Optionally, the output side of said valve connects to a pneumatic amplifier. In an alternative embodiment, the pneumatic amplifier is a vortex generator.

A system and method for protecting and clearing the lens of an optical surveillance device operating in a hostile environment have been described herein. It will be appreciated by those skilled in the art that minor modifications to the present inventions could be made without departing from the spirit of the invention disclosed. The addition of cleaning fluids or solids to the system is but one such example.

What is claimed is:

1. An optical surveillance device clearing apparatus of comprising:
    a protective mounting structure, having a cavity passing therethrough, the cavity having a lower portion and an upper portion;
    a lens cover recessed within the upper portion of the cavity and secured thereto;
    an optical surveillance device secured within the lower portion, the optical surveillance device having a lens structure directed to the upper portion and in contact with a bottom surface of the lens cover; and
    a gas output port positioned within the cavity to direct a burst of gas across a top surface of the lens cover for removing debris from the top surface.

2. The optical surveillance device clearing apparatus of claim 1, wherein the gas is compressed air.

3. The optical surveillance device clearing apparatus of claim 1, the apparatus further comprising:
    an airway between the gas output port and an air supply port on the outside of the protective mounting structure;
    a valve having an input side and an output side, the output side connected to the gas supply port;
    an actuator for opening and closing the valve remotely;
    a source of gas connected to the input side of the valve; and
    a controller connected to the actuator, the controller programmed to open and close the valve based on predetermined parameters.

4. The optical surveillance device clearing apparatus of claim 3, wherein a predetermined parameter is the length of time the valve is opened.

5. The optical surveillance device clearing apparatus of claim 3, wherein a predetermined parameter is the number of times the valve is open and closed.

6. The optical surveillance device clearing apparatus of claim 5, wherein a predetermined parameter is the length of time between openings of the valve.

7. The optical surveillance device clearing apparatus of claim 3, wherein the airway comprises a restricted section proximal to the gas output port.

8. The optical surveillance device clearing apparatus of claim 7, wherein the apparatus further comprises an air intake channel located between the restricted section and the gas output port, wherein the air intake channel receives air via an air intake hole on the outside of the protective mounting structure.

9. The optical surveillance device clearing apparatus of claim 1, wherein the lens cover is sapphire.

10. The optical surveillance device protection apparatus of claim 1, wherein the optical surveillance device, the lens, and the lens cover are secured in said protective mounting structure by a potting compound.

11. The optical surveillance device protection apparatus of claim 8, wherein the potting material is a silicone-based flowable caulk.

12. The optical surveillance device protection apparatus of claim 8, wherein the silicone-based flowable caulk is selected from the group consisting of either two part caulk or room temperature vulcanization caulk.

* * * * *